United States Patent
Sato et al.

[11] Patent Number: 6,127,810
[45] Date of Patent: Oct. 3, 2000

[54] CHARGE CONTROL METHOD AND CHARGER FOR A RECHARGEABLE BATTERY

[75] Inventors: Tsuneo Sato; Toshiharu Chuma, both of Asaka, Japan

[73] Assignee: Fuji Photo Film Co., Ltd., Minami-Ashigara, Japan

[21] Appl. No.: 09/137,809

[22] Filed: Aug. 21, 1998

[30] Foreign Application Priority Data

Sep. 12, 1997 [JP] Japan .................................... 9-248091
Dec. 25, 1997 [JP] Japan .................................... 9-356634

[51] Int. Cl.[7] .................................................. H02J 7/04
[52] U.S. Cl. ........................................ 320/148; 320/161
[58] Field of Search ..................................... 320/148, 161

[56] References Cited

U.S. PATENT DOCUMENTS

| | | | |
|---|---|---|---|
| 5,408,170 | 4/1995 | Umetsu et al. | 320/148 |
| 5,936,384 | 8/1999 | Fujiwata et al. | 320/134 |

FOREIGN PATENT DOCUMENTS

| | | |
|---|---|---|
| 0723326 | 7/1996 | European Pat. Off. . |
| 2192670 | 7/1990 | Japan . |
| 4123771 | 4/1992 | Japan . |
| 7274404 | 10/1995 | Japan . |
| 864256 | 3/1996 | Japan . |
| 9182308 | 7/1997 | Japan . |

*Primary Examiner*—Edward H. Tso
*Assistant Examiner*—Gregory J. Toatley, Jr.

[57] ABSTRACT

A method of controlling the charging of a rechargeable battery and a charger for practicing the same are disclosed. The battery voltage of the rechargeable battery, a voltage across the internal resistance of the battery and a voltage across a current setting resistor are added together and applied to the voltage detection input of a controller in the form of a sum voltage. The controller detects the sum voltages in the ON state (during charging) and OFF state (during interruption of charging) of a control FET (Field Effect Transistor), and calculates a difference between them. The controller determines, based on the difference, whether or not the battery has been fully charged, and then controls charging on the basis of the result of the decision.

14 Claims, 11 Drawing Sheets

CHARGE CONTROL METHOD AND CHARGER FOR A RECHARGEABLE BATTERY

BACKGROUND OF THE INVENTION

1. Field of the Invention

The present invention relates to a method of controlling the charging of a lithium ion battery, nickel-cadmium (Ni—Cd) battery, nickel-metal hydride (Ni—MH) battery or similar rechargeable battery, and a charger for practicing the same.

2. Description of the Background Art

Modern electronic apparatuses including notebook type personal computers and digital cameras are extremely small in size and light in weight and are often powered by rechargeable batteries. Rechargeable batteries for such an application include a lithium ion battery, an Ni—Cd battery and an Ni—MH battery. A lithium ion battery, for example, is a nonaqueous rechargeable battery using an organic solvent of lithium salt as an electrolyte. This kind of battery generates an electromotive force based on oxidation reduction derived from the migration of lithium ions. In this respect, a lithium ion battery is distinguishable from the other rechargeable batteries using water-soluble electrolytes and generating electricity based on electrochemical reactions in which water join. The nonaqueous rechargeable battery is advantageous over the other rechargeable batteries in that it implements a high voltage between battery terminals for a single battery or cell, a high capacity, and a high output. Charging methods for enhancing the performance of the nonaqueous rechargeable battery itself and further promoting the effective use of such a battery are under investigation.

It has been customary with a charger for charging a rechargeable battery to, e.g., insert a charge current sensing circuit in a charge line for charging the battery. The charge current sensing circuit senses a charge current flowing through the charge line. When the charge current decreases below a preselected value, the charger determines that the battery connected thereto has been fully charged. The charge current sensing circuit, however, increases a part mounting area required of the charger and thereby obstructs the miniaturization of the charger. Moreover, the conventional charge current sensing circuit needs a highly accurate and therefore expensive configuration, making the arrangement of the charger complex and sophisticated.

SUMMARY OF THE INVENTION

It is therefore an object of the present invention to provide a charge control method and a charger for a rechargeable battery capable of detecting the full-charge state of the battery with a simple configuration and executing accurate charge control.

A method of controlling charging of a rechargeable battery of the present invention begins with a step of detecting a first voltage which is the sum voltage of the battery voltage of the battery which a voltage across the internal resistance of the battery and appears during charging of the battery. A second voltage which is the sum voltage, but appears during interruption of charging of the battery, is detected. The charging of the rechargeable battery is controlled on the basis of the first voltage and second voltage.

Also, a charger for charging a rechargeable battery of the present invention includes a switch for selectively connecting or disconnecting, in response to a control signal, a DC power source, for charging the battery, to the battery. A charging circuit feeds the control signal for selectively turning on or turning off the switch to the switch to thereby control the charging of the battery. A controller detects the sum voltage of the battery voltage of the battery and a voltage across the internal resistance of the battery to thereby determine the charging condition of the rechargeable battery. The controller detects the sum voltage in each of the ON state and OFF state of the switch and calculates a difference between the resulting sum voltages to thereby determine the charging condition of the rechargeable battery on the basis of the difference.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
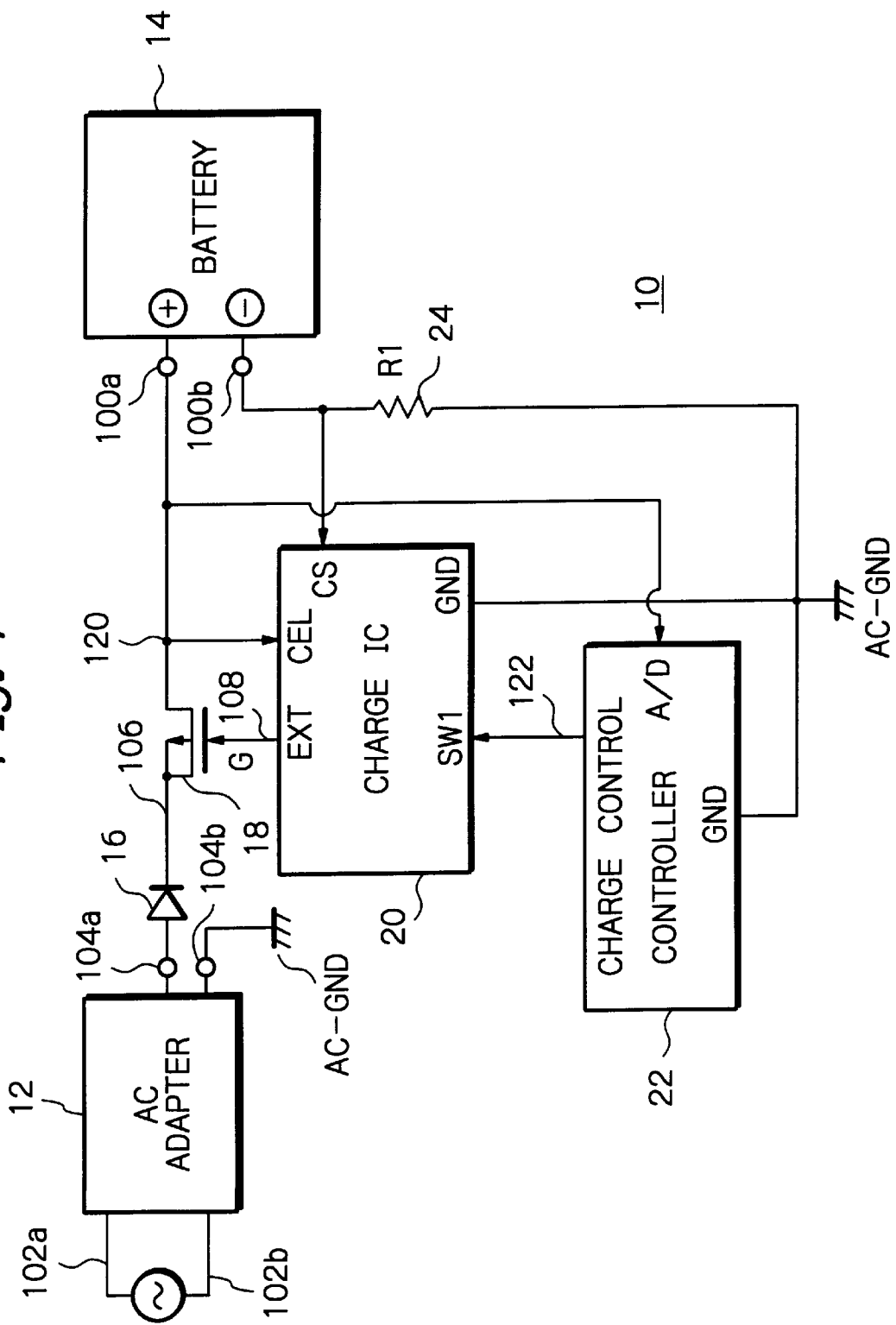
FIG. 1 is a block diagram schematically showing a charger embodying the present invention.

Referring to FIG. 1 of the drawings, a charger embodying the present invention is shown and generally designated by the reference numeral 10. As shown, the charger 10 includes output terminals 100*a* and 100*b* to which a rechargeable battery 14 is removably connected. The charger 10 receives a DC power source output via an AC adapter 12 so as to charge the rechargeable battery 14 therewith. The charger 10 is so constructed as to surely detect the full-charge state of the battery 14 and thereby execute charge control including charge ending. It is to be noted that parts and elements not directly relevant to the understanding to the present invention will not be shown or described, and that signals are designated by the reference numerals attached to connection lines on which they appear.

A commercially available AC 100 V power source, for example, is connected to input terminals 102*a* and 102*b* included in the AC adapter 12. The adapter 12 rectifies and smooths the output of the AC power source so as to produce a DC output for charging the battery 14 between its output terminals 104*a* and 104*b*. In this sense, the adapter 12 plays the role of a DC power source device. While the DC power source output from the adapter is connected to various circuits included in the charger 10 in order to drive them, such connection will not be described specifically.

The output terminal 104*a* of the adapter 12, i.e., the positive input terminal 104 of the charger 10 is connected to the source 106 of a control FET (Field Effect Transistor) 18 via a diode 16 which obstructs the reverse flow of a current. The negative input terminal 104*b* of the charger 10 is connected to ground AC-GND included in the charger 10. A charge IC (Integrated Circuit) 20 includes a charge control output EXT connected to the gate 108 of the control FET 18. The control FET 18 selectively connects or disconnects via resistor 24 the source 106 and drain 120 thereof when the potential on the gate 108 respectively goes high or goes low. The FET 18 therefore serves as a switch for selectively feeding the DC output of the AC adapter 12 to the output terminal 100*a*. The drain 120 of the FET 18 is connected to a battery voltage detection input CEL and a voltage detection input A/D respectively included in the charge IC 20 and a controller 22.

On the other hand, the output terminal 100*b* is connected to a voltage detection input CS included in the charge IC 20 and connected to ground AC-GND via a current setting resistor (R1) 24. Further, the terminal 100*b* is connected to a ground terminal GND included in the controller 22. In this configuration, a charge current flows from the AC adapter 12 (terminal 104*a*) to ground AC-GND via the diode 16, control FET 18, battery 14, and current setting resistor (R1) 24.

The charge IC 20 feeds a control signal (EXT) to the gate of the control FET 18 in order to selectively connect or disconnect the source and drain of the FET 18, i.e., to selectively set up or interrupt the supply of a voltage and a current to the battery 14. In the illustrative embodiment, the charge IC 20 measures the terminal voltage of the battery 14 appearing between its battery voltage detection input CEL and voltage detection input CS. The measurement is effected when the source and drain of the control FET 18 are disconnected from each other. Further, the charge IC 20 measures a voltage between its voltage detection input CS and ground terminal GND and therefore a voltage drop between the opposite ends of the current setting resistor (R1) 24. In addition, the charge IC 20 receives a charge control signal 122 from the controller 22 via its charge control input SW1. In response to this signal 122, the charge IC 20 outputs a charge control signal EXT for turning the control FET 18 on and off so as to control the charging of the battery 14 accordingly. Specifically, the controller 22 senses a voltage between the terminal 100*a* connected to the battery 14 and ground AC-GND and causes the charge IC 20 to control the charging in accordance with the variation of in above voltage.

Figure 2:
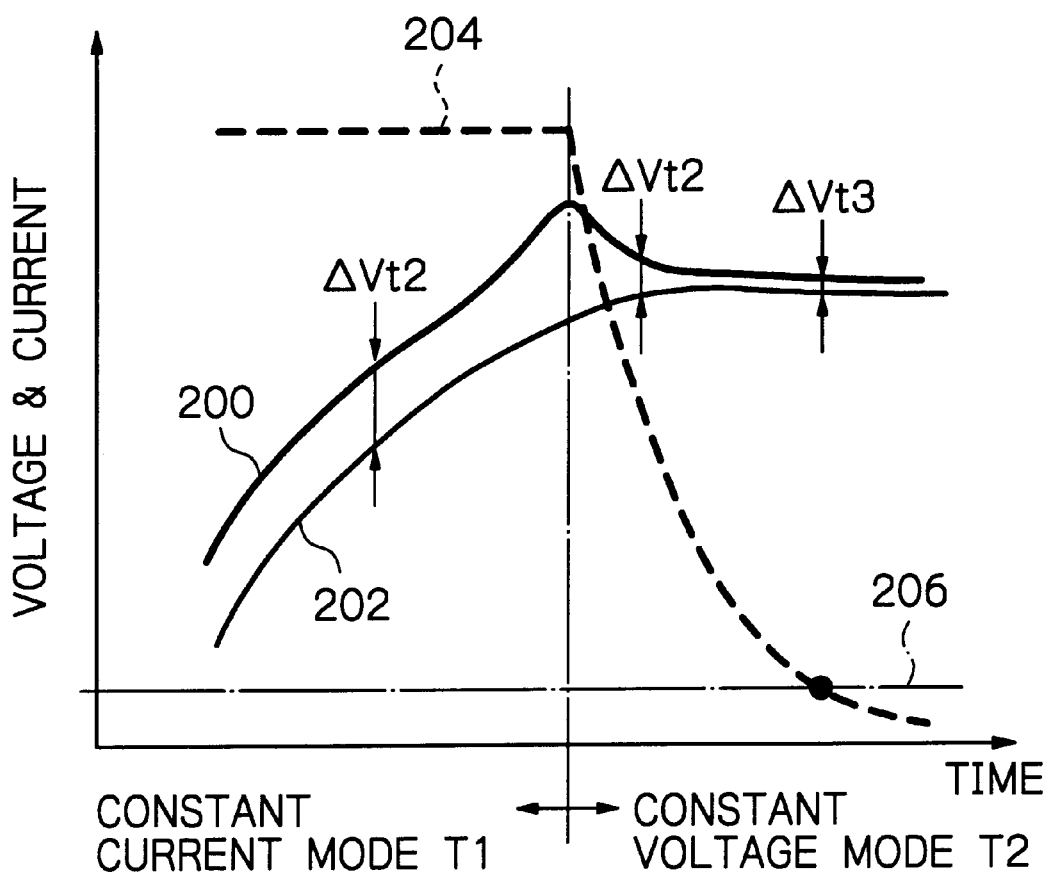
FIG. 2 is a graph representative of a relation between a charge voltage and a charge current in a constant current mode and those in a constant voltage mode particular to the charge of FIG. 1.

More specifically, as shown in FIG. 2, the voltage appearing on the voltage detection input A/D of the controller 22 begins to fall from its maximum value on the transition from the first period of time (first stage) T1 to a second period of time (second stage) T2. In response, the controller 22 supplies the inputs SW1 of the charge IC 20 in the constant voltage mode with the charging control signal 122 to which turns the charging on and off. Curves 200 and 202 shown in FIG. 2 respectively indicate a voltage appearing on the voltage detection input A/D during charging and a battery voltage appearing during interruption of charging. A dashed curve 204 is representative of the variation of the charge current. For reference, a dash-and-dot line 206 shows a full-charge decision line particular to a conventional scheme using a charge current for decision, as discussed earlier.

In the illustrative embodiment, the controller 22 determines, in the constant voltage mode (stage T2), whether or not the battery 14 has been fully charged on the basis of the variation of the voltage being applied to its voltage detection input A/D. The controller 22 executes full-charge processing, including stopping of the battery 14, in accordance with the result of the above decision, as will be described specifically later.

Figure 3:
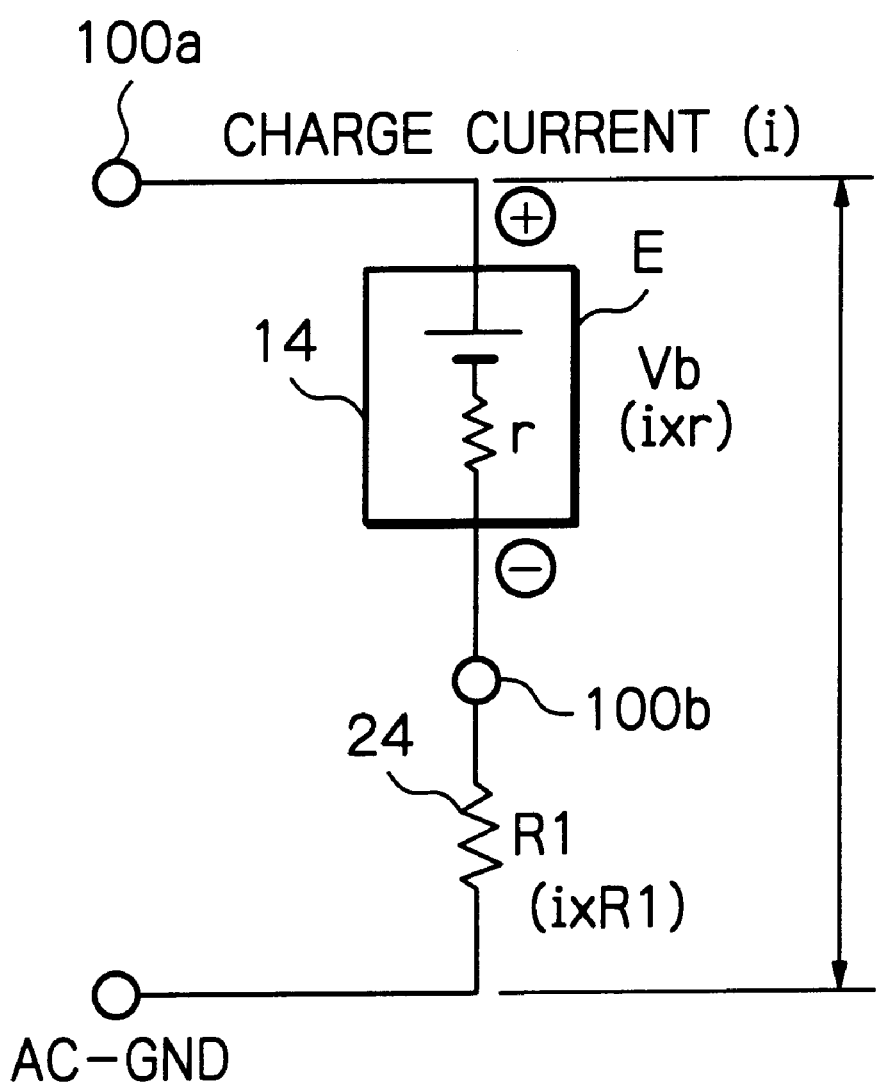
FIG. 3 is a circuit diagram showing the principle of the illustrative embodiment.

The battery 14 is representative of a battery pack accommodating in its casing a single battery or cell or a plurality of batteries or cells connected in series and/or in parallel. In the illustrative embodiment, the battery or batteries are assumed to be lithium ion batteries by way of example. Of course, the lithium ion batteries may be replaced with any other suitable rechargeable batteries, e.g., Ni—Cd batteries or Ni—MH batteries. FIG. 3 shows the principle or basic configuration of the battery 14. As shown, the battery 14 has thereinside a battery E for generating a battery voltage Vb and an internal resistance r. A charge current i flows through the battery 14 from the positive terminal (+) to the negative terminal (−). During charging, i.e., while the charge current i is flowing, a voltage V between the terminal 100*a* and ground AC-GND, FIG. 1, is the sum of the battery voltage Vb, voltage (i×r) across the internal resistance r, and voltage (i×R1) across the current setting resistance R1, i.e., V=Vb+(i×r)+(i×R1).

Assume that the control FET 18 is turned off while charging is under way. Then, the voltage V between the terminal 100*a* and ground AC-GND to appear on the interruption of charging is equal to the battery voltage Vb, i.e., V=Vb. It follows that a difference ΔV between the voltage during charging and the voltage during interruption of charging is the sum of the voltages (i×r) and (i×R1), i.e., ΔV=(i×r)+(i×R1)=i(r+R1).

As shown in FIG. 2, assume a difference ΔVt1 between the voltage during charging and the voltage during interruption of charging at the stage T1 (constant current mode), and differences ΔVt2 and ΔVt3 between the same at the stage T2 (constant voltage mode). It will be seen that the difference ΔV sequentially decreases with a decrease in charge current 204, i.e., there holds a relation of ΔVt1>ΔVt2>ΔVt3.

The above relation indicates that the charge current sequentially decreases as the battery 14 approaches its full-charge state, causing the difference ΔV between the voltage during charging and the voltage during interruption of charging and occurring between the terminal 100*a* and ground AC-GND to decrease. By detecting such a decrease, the controller 22 is capable of determining whether or not the battery 14 has been fully charged. Specifically, the controller 22 digitizes the analog voltage values sequentially input to its voltage detection input A/D, produces a difference ΔV between the digitized voltage values, and compares the difference ΔV with a preselected reference value k. When the difference ΔV decreases below the reference value k, the controller 22 determines that the battery 14 has been fully charged, and then stops charging the battery 14 immediately or on the elapsing of a preselected period of time. The reference value k used for the above decision is selected in matching relation to the configuration of the battery 14 beforehand. It is to be noted that the voltage (i×R1) across the current setting resistor R1 does not have to be added if an arrangement is so made as to determine the difference ΔV in terms of the voltage (i×r) across the internal resistance r.

Figure 4:
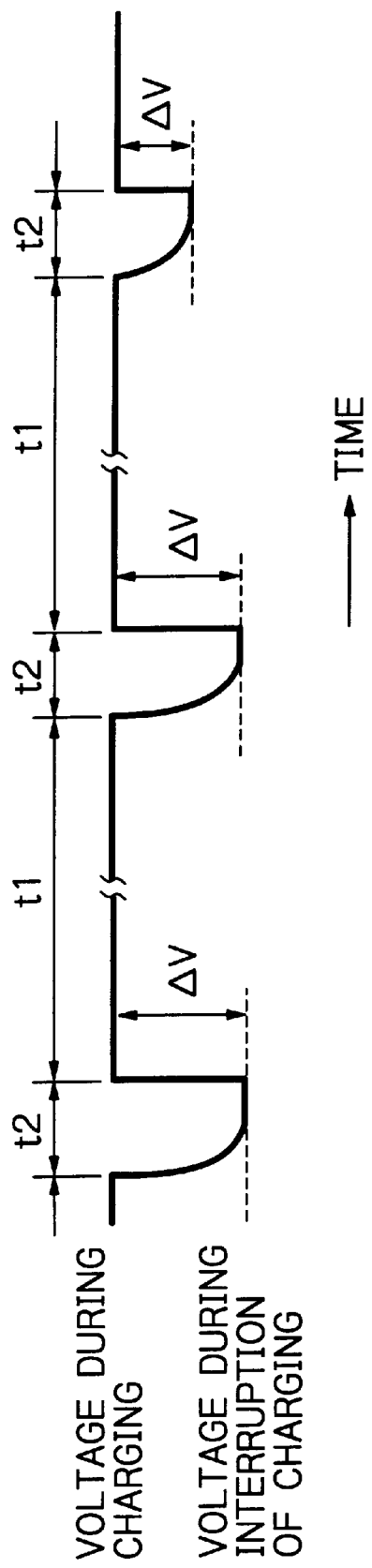
FIG. 4 shows the variation of a voltage $\Delta V$ between a voltage during charging and a voltage during interruption of charging in the illustrative embodiment.

The controller 22 periodically feeds to the charge IC 20 the charge control signal 122 for turning on the control FET 18 for a preselected period of time and the charge control signal 122 for turning it off for a preselected period of time. While the control FET 18 is an ON state, the controller 22 detects a voltage appearing during interruption of charging between the terminal 100a and ground AC-GND. As shown in FIG. 4, in the illustrative embodiment, the controller 22 measures a voltage during charging over a period of time t1 while counting the period of time t1, and then measures a voltage during interruption of charging over a period of time t2 while counting the period of time t2.

A specific operation of the charger 10 will be described with reference to FIGS. 4 and 5. In the illustrative embodiment, the charger 10 operates in the constant current mode (T1, FIG. 2) from the time when it starts charging the battery 14 to the time when the charge voltage of the battery 14 reaches its peak. Upon detecting the fall of the charge voltage from the peak, the charger 10 starts operating in the constant voltage mode (T2, FIG. 2). In the constant voltage mode, the controller 22 feeds a charge control signal 122 to the charge IC 20. In response, the charge IC 20 turns on the control FET 18 with its output 108, with the result being that a charge current is fed from the AC adapter 12 to the battery 14 via the charger 10, charging the battery 14 without any interruption (step 500).

While the battery 14 is charged by the charge current, the controller 22 digitizes a voltage value V applied to its voltage detection input A/D and recognizes it (step 502). Subsequently, the controller 22 starts counting the preselected period of time t1 (step 504) and then determines whether or not the period of time t1 has expired (step 506). If the answer of the step 506 is negative (N), the program returns to the step 502 and repeats the loop consisting of the steps 502–506. If the answer of the step 506 is positive (Y), the controller 22 initializes the count and causes the charge IC 20 to turn off the control FET 18, thereby interrupting the charging of the battery 14 (step 508).

After the step 508, the controller 22 starts counting the other preselected period of time t2 (step 510) and then determines whether or not the period of time t2 has elapsed (step 512). If the answer of the step 512 is N, the program returns to the step 510 and repeats the consecutive steps 510 and 512. On the elapse of the period of time t2 (Y, step 512), the controller 22 initializes the count and again recognizes a voltage applied to its voltage detection terminal A/D in terms of a digital value (step 514). Then, the controller 22 calculates a difference $\Delta V$ between the voltage measured during charging in the step 502 and the voltage measured during interruption of charging in the step 514 and determines whether the difference $\Delta V$ is smaller than the reference value k (step 516). If the difference $\Delta V$ is smaller than the reference value k (Y, step 516), then the step 516 is immediately followed by a step 518. If the difference $\Delta V$ is not smaller than the reference value k (N, step 516), then the program returns to the step 500 and repeats the loop consisting of the steps 500–516.

When the above difference $\Delta V$ sequentially decreases from $\Delta Vt2$ toward $\Delta Vt3$, as determined by the repeated steps 500–516, the controller 22 determines, as a result of the step 516, that the battery 14 has been fully or almost fully charged. Then, the controller 22 executes full-charge processing, i.e., ends the charging operation while maintaining the control FET 18 in its OFF state via the charge IC 20 (step 518). The controller 22 may stop the charging operation immediately or may stop it on the elapse of a period of time suitable for the kind of the rechargeable battery 14 and charging environment. In this manner, the charger 10 is capable of surely charging the battery 14 without directly measuring the charge current.

Figure 6:
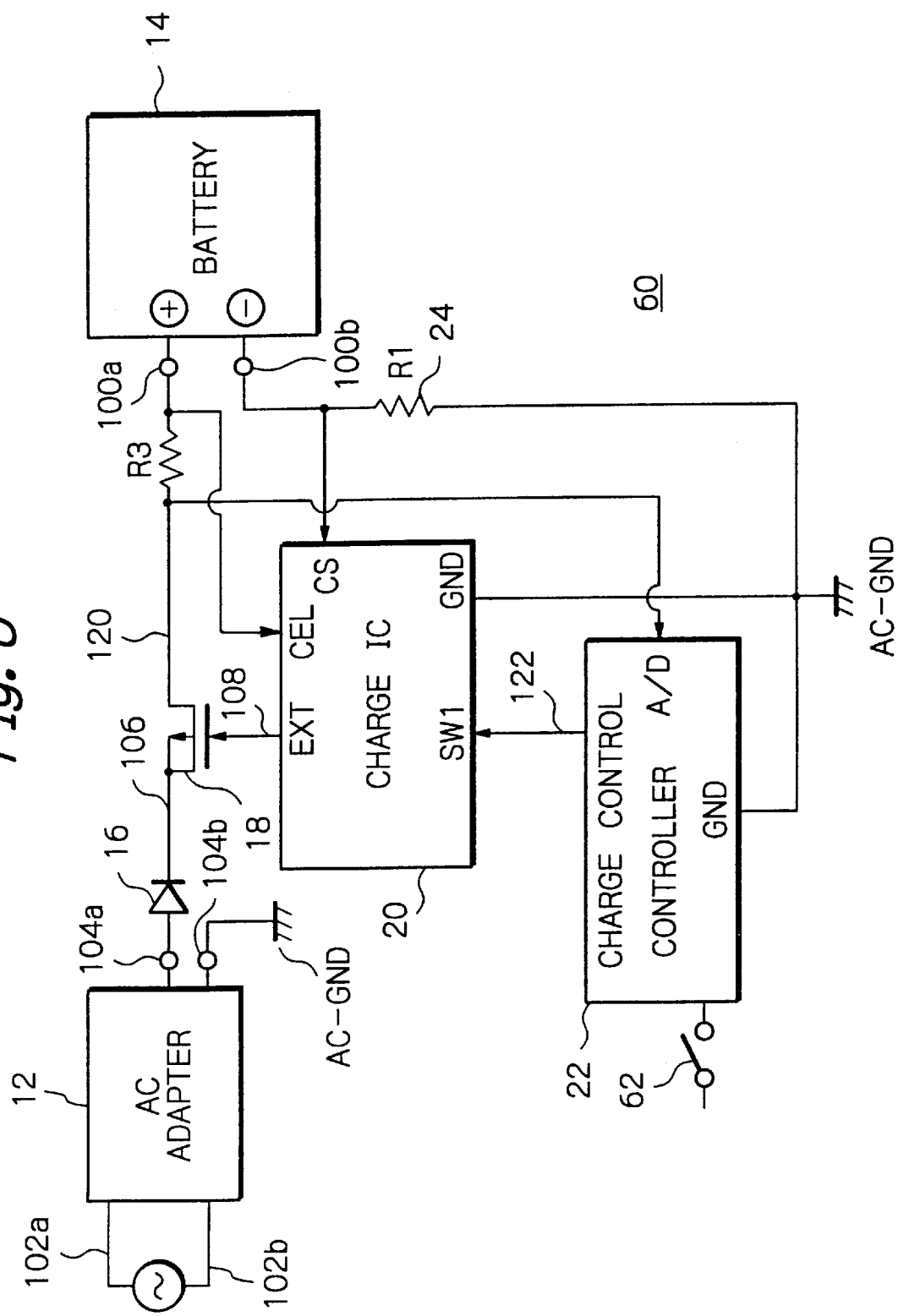
FIG. 6 is a block diagram schematically showing an alternative embodiment of the present invention.

FIG. 6 shows an alternative embodiment of the present invention. As shown, a charger, labeled 60, is identical with the charger 10 of FIG. 1 except that an extra resistor R3 is serially connected between the drain of the control FET 18 and the terminal 100a, and that a switch 62 is connected to the controller 22 for effecting charging matching with the kind of the rechargeable battery 14. In the illustrative embodiment, the controller 22 is capable of selecting one of a plurality of periods of time T1, one of a plurality of periods of time t2, and one of a plurality of reference values k in accordance with the ON/OFF state of the switch 62. The charger 60 can therefore charge the battery 14 in a condition adequate for the kind of the battery 14.

Figure 7:
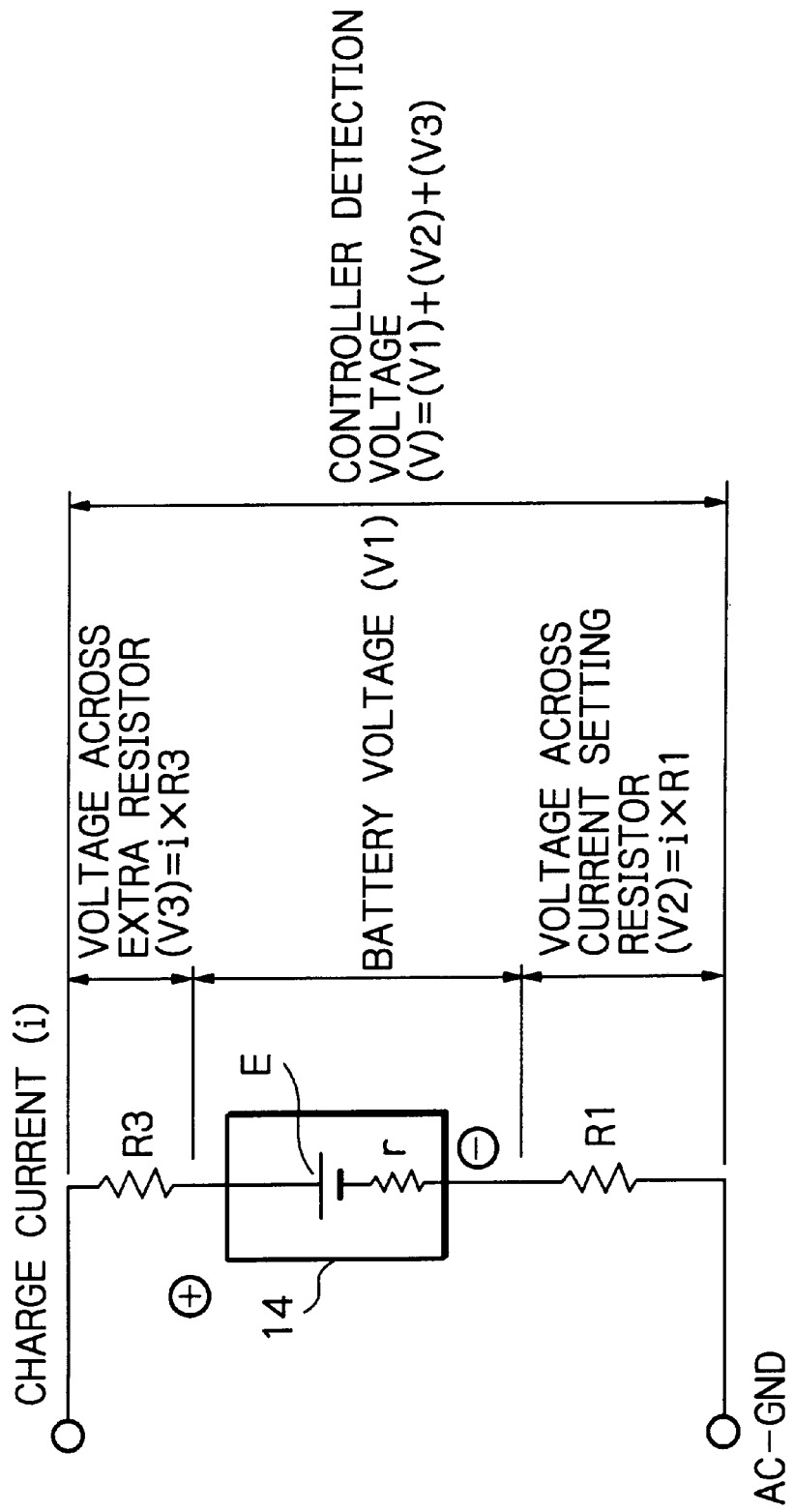
FIG. 7 shows the principle of the embodiment of FIG. 6.

FIG. 7 shows the principle of the rechargeable battery 14 included in the above alternative embodiment. As shown, the battery 14 has thereinside a battery E generating a voltage Vb and an internal resistance r. The charge voltage at the time of charging during which a charge current i flows, i.e., the voltage V between the terminal 100a and ground AC-GND shown in FIG. 6 is the sum of a voltage $V3=(i\times R3)$ across the extra resistor R3, the battery voltage $V1=Vb+(i\times r)$, and the voltage $V2=(i\times R1)$ across the current setting resistor R1. The controller 22 measures such a charge voltage. Therefore, the voltage detected by the controller 22 in this embodiment is higher than the voltage detected by the same in the previous embodiment by V3. Consequently, the difference $\Delta V$ between the voltage during charging and the voltage during interruption of charging increases and allows the full-charged state of the battery 14 to be detected more easily.

As stated above, the illustrative embodiments are practicable without resorting to a current sensing circuit heretofore used to determine whether or not a battery has been fully charged. Moreover, the embodiments do not measure a voltage between the terminals 100a and 100b. Specifically, the embodiments each calculate a difference between the voltage between the terminal 100a and ground AC-GND during charging and the resistance between the same during interruption of charging, with or without the addition of a voltage across an extra resistor for increasing the above difference, and determines whether or not the battery 14 has been fully charged on the basis of the difference. With this configuration, it is possible to sense the battery voltage relatively and accurately. The embodiments can therefore surely charge the battery 14 with a simple construction.

Figure 8:
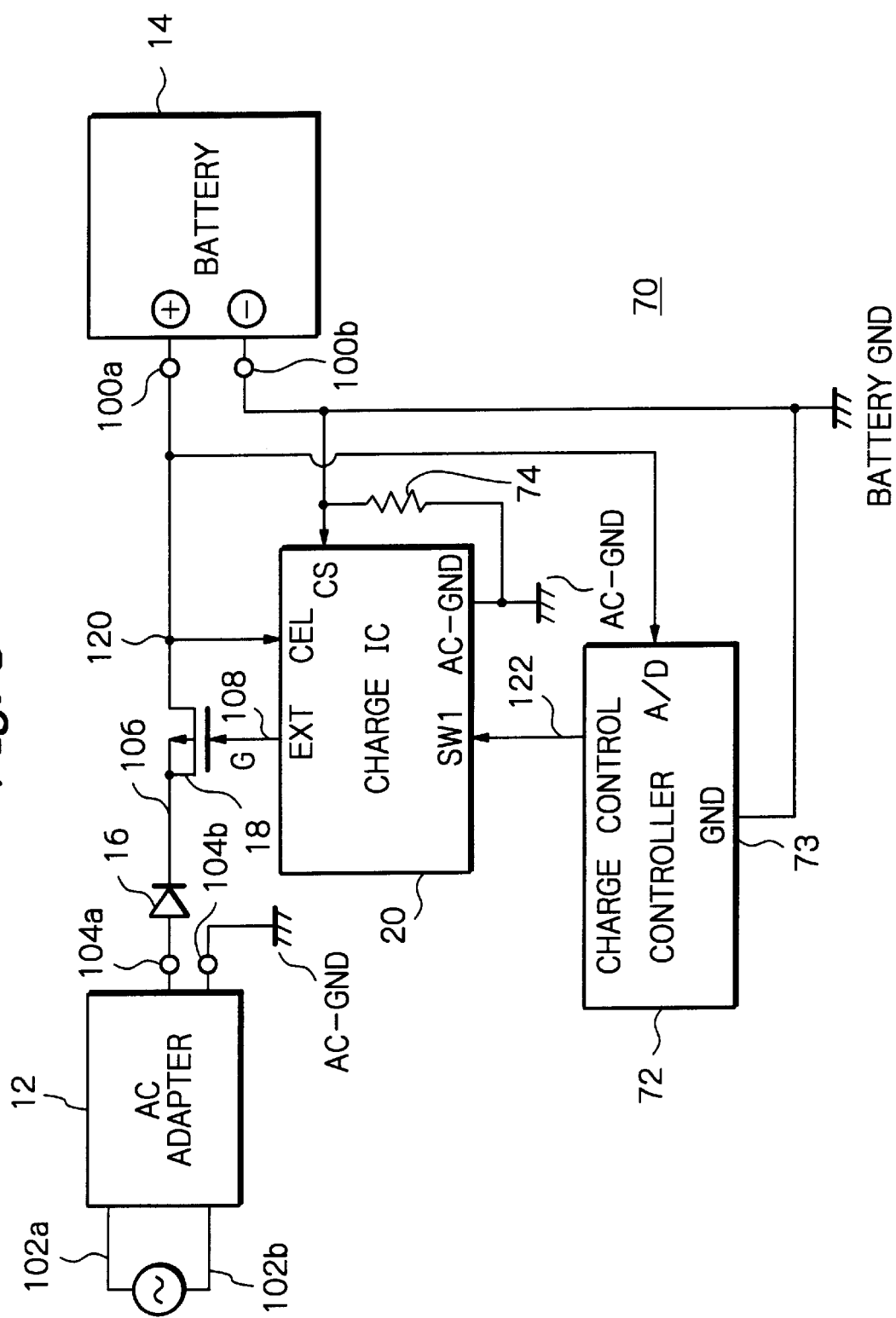
FIG. 8 is a schematic block diagram showing another alternative embodiment of the present invention.

Referring to FIG. 8, another alternative embodiment of the present invention will be described. This embodiment is capable of detecting the voltage difference $\Delta V$ in terms of the voltage $(i\times r)$ across the internal voltage of the battery, as mentioned earlier in relation to the embodiment of FIG. 1. The prerequisite with this alternative embodiment is that the internal resistance r of the rechargeable battery 14 be enough for the voltage difference $\Delta V$ to be detected. Specifically, the previous embodiments each uses the voltage across the current setting resistor R1 and, if desired, the voltage across the extra resistor R3 on the assumption that the internal resistance of the voltage 14 is low. Experiments showed that even with a lithium ion battery, lithium polymer battery or similar rechargeable battery, it is possible to determine a charging state by using a voltage derived from the internal resistance of the battery. Therefore, the embodiment to be described makes it needless to add the voltage across the current setting resistor or the voltage across the extra resistor to the battery terminal voltage and voltage across the internal resistance.

As shown in FIG. 8, a charger, generally 70, is similar to the charger 10 of FIG. 1 except for the following. A controller 72 includes a ground terminal 73 not connected to ground AC-GND constituting the charge path and power supply paths for the various circuits, but connected to the terminal 100b to which the negative terminal of the battery 14 is connected. The ground terminal 73 therefore constitutes battery GND. Also, the terminal 100b and ground AC-GND associated with the negative terminal of the AC adapter 12 are connected in series via a current setting resistor 74 used to set a charge current. As for the rest of the construction, this embodiment is identical with the embodiment of FIG. 1.

Figure 9:
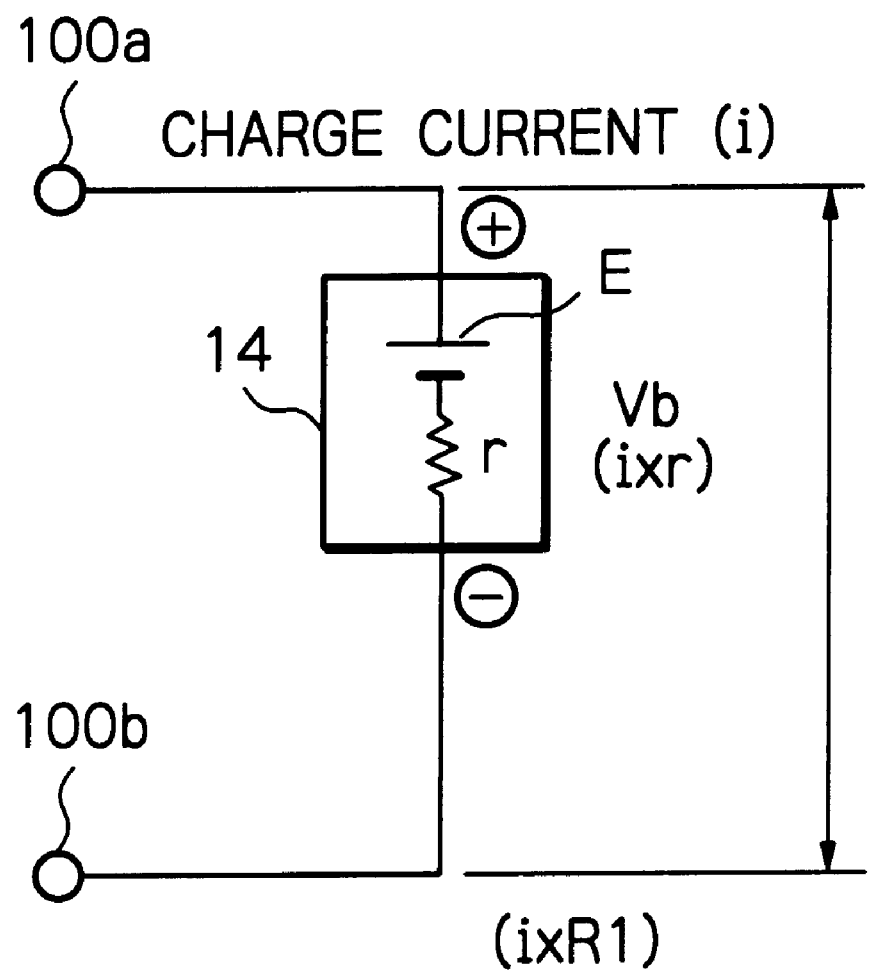
FIG. 9 shows the principle of the embodiment of FIG. 8.

The principle of the illustrative embodiment will be described with reference to FIG. 9. As shown, the rechargeable battery 14 has thereinside a battery E for generating a battery voltage Vb and an internal resistance r. A charge current i is fed from the positive terminal to the negative terminal of the battery so as to charge the battery. While the charge current i is flowing, i.e., during charging, a charge voltage V1 between the terminals 100a and 100b (battery GND) is the sum of the battery voltage Vb and the voltage (i×r) across the internal resistance r, i.e., V1=Vb+(i×r). When the control FET 18 is turned off to interrupt charging under way, a voltage V2 equal to the battery voltage Vb appears between the terminals 100a and 100b, i.e., V2=Vb. Therefore, a difference ΔV between the voltage during charging and the voltage during interruption of charging is equal to the voltage (i×r), i.e., ΔV=V1−V2=i×r.

Figure 10:
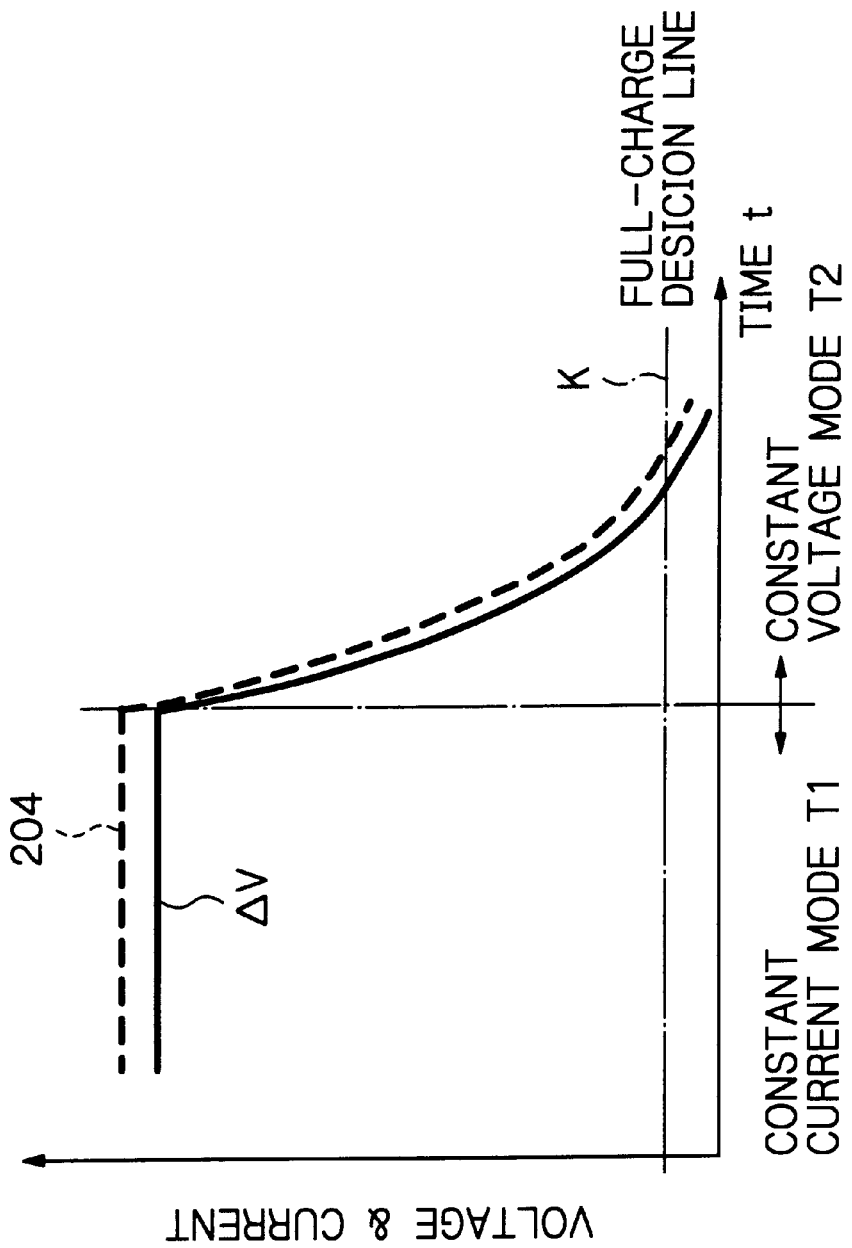
FIG. 10 shows how a charge current and the variation of the voltage difference $\Delta V$ between a voltage during charging and a voltage during interruption of charging in the embodiment of FIG. 8.

As shown in FIG. 10, the difference ΔV between the voltage during charging and the voltage during interruption of charging sequentially decreases in the stage T2 with a decrease in charge current 204. That is, in the illustrative embodiment, too, the charge current decreases as the battery 14 approaches its full-charge state. As a result, the difference ΔV between the voltage during charging and the voltage during interruption of charging decreases in proportion to the charge current. By detecting the decrease ΔV in voltage, the controller 72 can determine the charging state of the battery 14. For this purpose, the controller 72 includes an analog-to-digital conversion circuit, not shown for converting the analog voltage applied to its voltage detection input A/D to a digital value. The controller 72 compares the above difference ΔV with the preselected digital value or reference value k. When the difference ΔV decreases below the reference value k, the controller 72 determines that the battery 14 has been fully charged. Then, the controller 72 executes the full-charge processing immediately or on the elapse of a preselected period of time. Again, the reference value k is used to determine the charging condition of the battery 14 and suitably selected in matching relation to the configuration of the battery 14.

Figure 5:
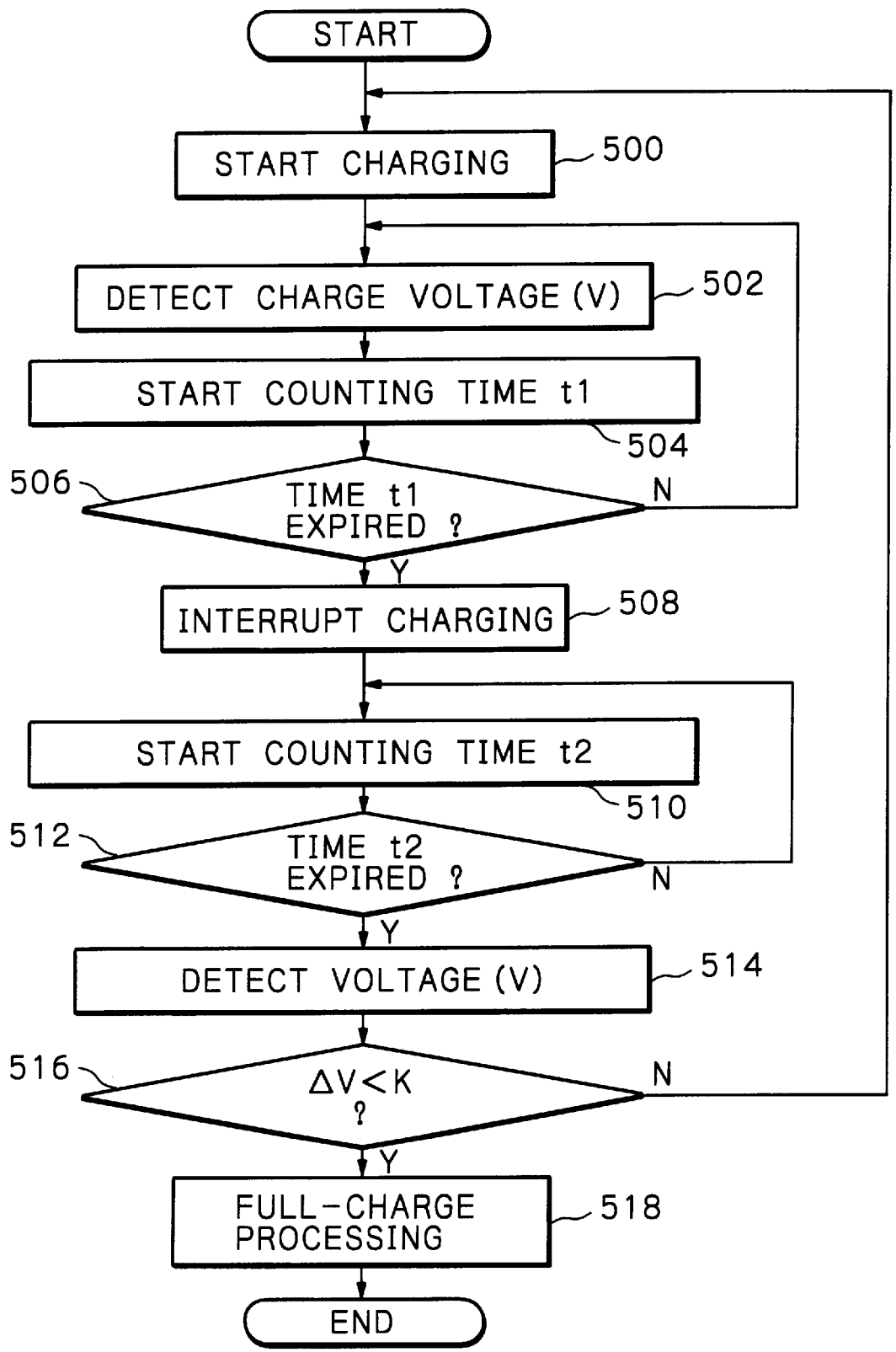
FIG. 5 is a flowchart demonstrating a specific operation of the illustrative embodiment.
Figure 11:
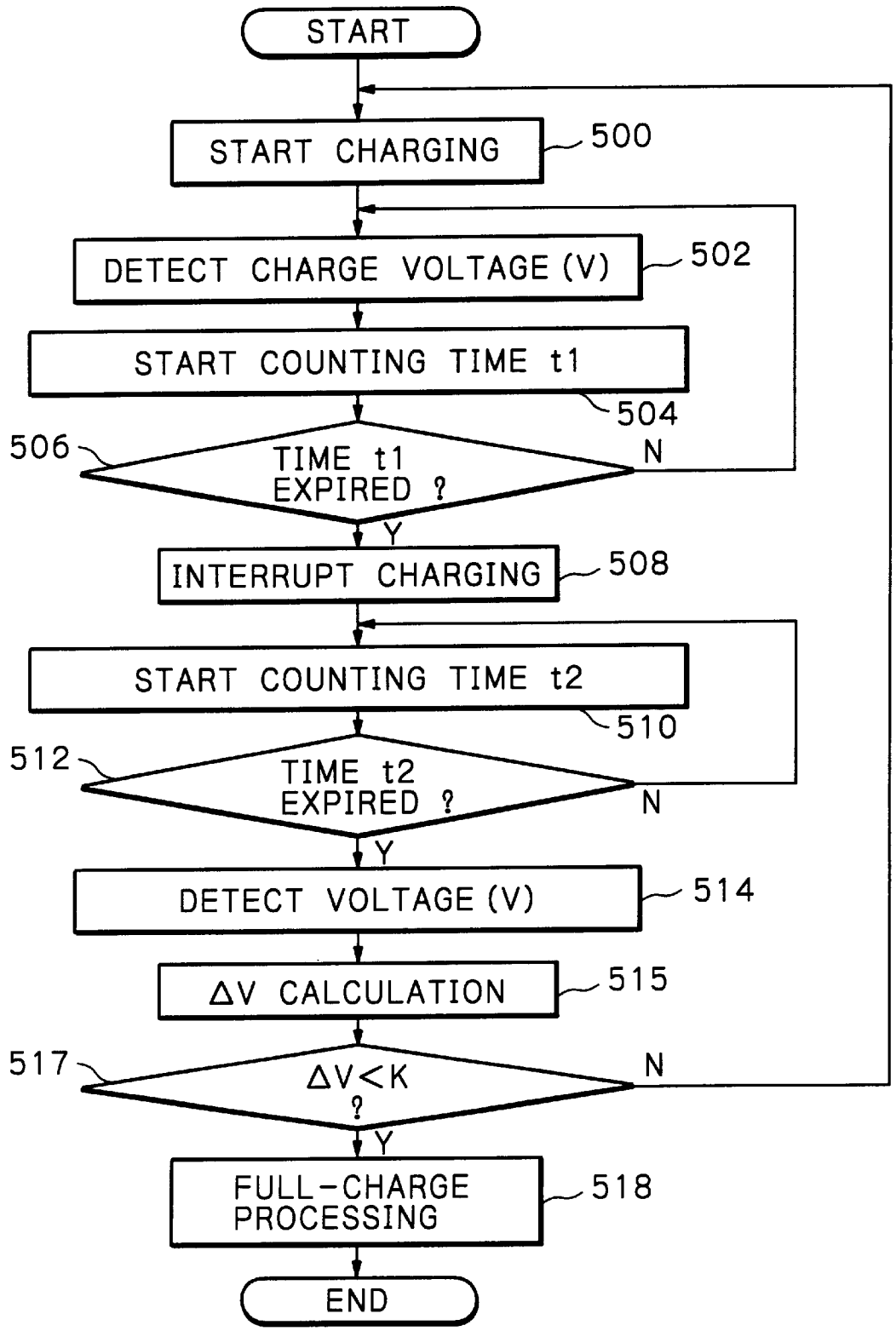
FIG. 11 is a flowchart demonstrating a specific operation of the embodiment of FIG. 8.

FIG. 11 demonstrates a specific operation of the charger 70 which is identical with the operation of FIG. 5 except for the following. As shown, the step 516 of FIG. 5 is replaced with steps 515 and 517. The voltage difference ΔV is calculated in the step 515 and then compared with the reference value k in the step 517.

The controller 72, like the controller 22 of FIG. 1, periodically measures a charge voltage during charging and a battery terminal voltage during interruption of charging, periodically calculates a difference ΔV between them, and compares the result of calculation with the reference value k. If the difference ΔV is smaller than the reference value k (Y, step 517), then the controller 72 executes the full-charge processing (step 518) and ends the charging operation. If the difference ΔV is not smaller than the reference value k (N, step 517), then the program returns to the step 500 and periodically repeats the steps 500–517 while continuing the charging operation. Again, an arrangement may be made such that when the difference ΔV and reference value k are substantially equal, i.e., when a difference between them is substantially zero, the controller 72 executes the full-charge processing (step 518). Also, the controller 72 may end the charging operation on the elapse of a preselected period of time suitable for the kind of the battery 14 and charging environment. Further, even after the full-charge processing, the controller 72 may continuously monitor the battery voltage and again execute the step 500 and successive steps in response to a decrease in battery capacity ascribable to the consumption of the battery 14.

Assume that the controller 72 itself or its analog-to-digital conversion circuit is so constructed as to operate at a low voltage, e.g., 3.3 V lower than the terminal voltage of the battery 14 e.g., 4.1 V. Then, to compensate for a decrease in the input range that can be converted, the controller 72 may include a division circuit for dividing the voltage applied to its input A/D. In such a case, the controller 72 will digitize a voltage value corresponding to a voltage division ratio and compare the resulting digital value with a reference value k' for determining whether or not the battery 14 has been fully charged.

Further, assume that the battery 14 is implemented as a battery pack including not only batteries but also a protection circuit for protecting the batteries from, e.g., overcurrent ascribable to the charge and discharge of the batteries. Then, although the internal resistance of the individual battery may be small, resistance particular to the internal circuitry of the battery pack lowers the voltage. This also makes it needless for the charger 70 to detect the voltage across the current setting resistor.

As stated above, the illustrative embodiment is capable of detecting the terminal voltages of the battery 14 during charging and during interruption of charging and producing a difference ΔV between them. The embodiment can therefore control charging in accordance with the internal resistance of the rechargeable battery without detecting a voltage drop derived from the current setting resistor 74.

In summary, it will be seen that the present invention provides a simple charger capable of fully charging a rechargeable battery without resorting to the conventional circuit for sensing a charge current. Basically, the charger of the present invention detects, e.g., a voltage across the internal resistance of the rechargeable battery, and controls the charging of the battery on the basis of a difference ΔV between a voltage during charging and a voltage during interruption of charging. The present invention also provides a method of so controlling the charging of the rechargeable battery.

The entire disclosure of Japanese patent application Nos. 248091/1997 and 356634/1997 respectively filed on Sep. 12, 1997 and Dec. 25, 1997 including the specifications, claims, accompanying drawings and abstracts of the disclosure are incorporated herein by reference in their entirety.

While the present invention has been described with reference to the illustrative embodiments, it is not to be restricted by the embodiments. It is to be appreciated that those skilled in the art can change or modify the embodiments without departing from the scope and spirit of the present invention.

What is claimed is:

1. A method of controlling charging of a rechargeable battery, comprising the steps of:

detecting a first voltage which is a sum voltage of a battery voltage of the rechargeable battery and a voltage across an internal resistance of said rechargeable battery, which appears during charging of said rechargeable battery;

detecting a second voltage which is said sum voltage, but which appears during interruption of charging of the rechargeable battery; and controlling the charging of the rechargeable battery on the basis of said first voltage and said second voltage, wherein a current setting resistor for setting a current for the rechargeable battery is serially connected to a charge path for charging said rechargeable battery, wherein a voltage across said current setting resistor is additionally added to said first voltage, and wherein said voltage across said current setting resistor appearing during interruption of the charging is additionally added to said second voltage.

2. A method in accordance with claim 1, wherein a difference between said first voltage and said second voltage is calculated in order to control the charging of the rechargeable battery on the basis of said difference.

3. A method in accordance with claim 2, wherein said difference is compared with a preselected reference value for determining whether or not the rechargeable battery has been fully charged to thereby control the charging of said rechargeable battery on the basis of a result of the comparison.

4. A method in accordance with claim 1, wherein said first voltage and said second voltage each is a voltage between a first terminal and a second terminal to which a positive terminal and a negative terminal of the rechargeable battery are respectively connected, and wherein said second terminal is not connected to ground of a charge path for charging said rechargeable battery, but is connected to a reference potential different from the ground.

5. A method in accordance with claim 4, wherein said second terminal is serially connected to ground of said charge path via a current setting resistor for setting a current value for the rechargeable battery.

6. A method of controlling charging of a rechargeable battery, comprising the steps of:

detecting a first voltage which is a sum voltage of a battery voltage of the rechargeable battery and a voltage across an internal resistance of said rechargeable battery which appears during charging of said rechargeable battery;

detecting a second voltage which is said sum voltage, but which appears during interruption of charging of the rechargeable battery; and controlling the charging of the rechargeable battery on the basis of said first voltage and said second voltage, wherein an extra resistor is serially connected to a charge path for charging the rechargeable battery, wherein a voltage across said extra resistor is additionally added to said first voltage, and wherein said voltage across said extra resistor appearing during interruption of the charging is additionally added to said second voltage.

7. A method in accordance with claim 6, wherein a difference between said first voltage and said second voltage is calculated in order to control the charging of the rechargeable battery on the basis of said difference.

8. A method in accordance with claim 7, wherein said difference is compared with a preselected reference value for determining whether or not the rechargeable battery has been fully charged to thereby control the charging of said rechargeable battery on the basis of a result of the comparison.

9. A method in accordance with claim 6, wherein said first voltage and said second voltage each is a voltage between a first terminal and a second terminal to which a positive terminal and a negative terminal of the rechargeable battery are respectively connected, and wherein said second terminal is not connected to ground of a charge path for charging said rechargeable battery, but is connected to a reference potential different from the ground.

10. A method in accordance with claim 9, wherein said second terminal is serially connected to ground of said charge path via a current setting resistor for setting a current value for the rechargeable battery.

11. A charger for charging a rechargeable battery, comprising:

a switch for selectively connecting or disconnecting, in response to a control signal, a DC power source, for charging the rechargeable battery, to said rechargeable battery;

a charging circuit for feeding said control signal for selectively turning on or turning off said switch to said switch to thereby control charging of the rechargeable battery; and a controller for detecting a sum voltage of a battery voltage of the rechargeable battery and a voltage across an internal resistance of said rechargeable battery to thereby determine a charging condition of said rechargeable battery;

said controller detecting the sum voltage in each of an ON state and an OFF state of said switch and calculating a difference between resulting sum voltages to thereby determine the charging condition of the rechargeable battery on the basis of said difference, wherein the sum voltage further includes a voltage across a current setting resistor which is serially connected to a charge path for charging the rechargeable battery in order to set a charge current for said rechargeable battery.

12. A charge in accordance with claim 11, wherein said controller calculates a difference between a preselected reference value for determining a full-charge state of the rechargeable battery and said difference between said resulting sum voltages to thereby determine whether or not said rechargeable battery has been fully charged.

13. A charger for charging a rechargeable battery, comprising:

a switch for selectively connecting or disconnecting, in response to a control signal, a DC power source, for charging the rechargeable battery, to said rechargeable battery;

a charging circuit for feeding said control signal for selectively turning on or turning off said switch to said switch to thereby control charging of the rechargeable battery; and a controller for detecting a sum voltage of a battery voltage of the rechargeable battery and a voltage across an internal resistance of said rechargeable battery to thereby determine a charging condition of said rechargeable battery;

said controller detecting the sum voltage in each of an ON state and an OFF state of said switch and calculating a difference between resulting sum voltages to thereby determine the charging condition of the rechargeable battery on the basis of said difference, wherein the sum voltage further includes a voltage across an extra resistor serially connected to a charge path for charging the rechargeable battery.

14. A charger in accordance with claim 13, wherein said controller calculates a difference between a preselected reference value for determining a full-charge state of the rechargeable battery and said difference between said resulting sum voltages to thereby determine whether or not said rechargeable battery has been fully charged.

* * * * *